United States Patent [19]
Tersch

[11] 3,872,701
[45] Mar. 25, 1975

[54] METHOD FOR ROLL FINISHING SPUR GEARS
[75] Inventor: Richard W. Tersch, Grosse Pointe Woods, Mich.
[73] Assignee: Lear Siegler, Inc., Santa Monica, Calif.
[22] Filed: Oct. 9, 1973
[21] Appl. No.: 404,774

[52] U.S. Cl.................................. 72/102, 72/91
[51] Int. Cl.................................... B21h 5/02
[58] Field of Search ............... 72/91, 102; 29/159.2

[56] References Cited
UNITED STATES PATENTS
3,345,845  10/1967  Marcovitch et al.................. 72/91

FOREIGN PATENTS OR APPLICATIONS
1,155,080  10/1963  Germany........................... 72/199

Primary Examiner—Lowell A. Larson
Attorney, Agent, or Firm—Whittemore, Hulbert & Belknap

[57]        ABSTRACT

Improvement in tooth form of small pinions is obtained by rolling the pinions under tight mesh pressure conditions with a die in the form of an internal gear.

7 Claims, 3 Drawing Figures 3,872,701

METHOD FOR ROLL FINISHING SPUR GEARS

BRIEF SUMMARY OF THE INVENTION

While some success has been achieved in finish-rolling helical gears and pinions with external rolling dies in the form of gears conjugate to the work gears, this success has not extended to roll-finishing of spur gears.

Conventional roll-gear finishing prior to the present invention employs one or a plurality of external gear-like rolling dies adapted to mesh with a work piece with their axes parallel. A relative depth feed under very heavy pressure is provided between the gear and die or dies in a direction perpendicular to the axes of the members. It is a characteristic of meshing spur gears with parallel axes that contact between a tooth of one gear and a tooth of the mating gear is established and terminated instantaneously across the full overlapping width of the teeth. As a result of this, meshing engagement between any two teeth of a set is accompanied by a slight shock or impact and similarly, when the meshing engagement is terminated, it is terminated instantanously which again tends to produce an unevenness in the meshing contact. between The foregoing is quite different from the meshing engagement betwen helical gears on parallel axes, in which contact is initiated at a point at one side of the gear tooth and extends progressively across the tooth face width until full contact is attained. Similar action results when the mating tooth surfaces come out of contact. This is believed to be the primary reason that accurate finishing of helical gears, employing parallel axes and one or more helical dies, has proved feasible.

One of the conditions controlling the action of a pair of gears in mesh is the number of teeth in contact. Except in rare cases, the number of teeth in contact between the teeth of a pair of mating gears is not constant, but varies in most cases by a single digit, as for example, between one and two. It is quite common to refer to a pair of operating gears as having for example, a contact ratio of 1.7 or 1.7 teeth in contact. This in fact means that the gears have two sets of teeth in contact part of the time and only one set of teeth in contact during the remainder of the time. The decimal indication of a contact ration of 1.7 or 1.7 teeth in contact means that two teeth of each gear are in contact for 0.7 of the time and only one tooth on each gear is in contact for 0.3 of the time. The foregoing assumes backlash, which of course does not exist in the tight mesh condition characteristic of gear rolling.

It will further be apparent that in gear rolling, where the operation involves the displacement of metal on the surfaces of the teeth of the gear as a result of the relatively great pressure exerted by the teeth of the hardened steel die, that the number of teeth in contact and the width of the band of contact has a dominating effect on the results obtained. During the interval when, for example, contact between the die and gear is limited to a single pair of teeth, all of the pressure being applied between the gear and die is concentrated on the engaged surfaces of the teeth of thie tool and die. When the number of teeth in contact changes, as for example from one pair of teeth to two pairs of teeth, the unit pressure exerted to the zones of contact becomes approximately one-half the magnitude of the pressure exerted when two teeth are in contact.

A second factor which influences the results obtained in finishing gears by rolling in mesh under relatively great pressure with a die in the form of a conjugate gear is the width of the band of contact between the teeth of the gear and die.

The teeth of the internal die will tend to envelop the teeth of the external work gear, thus increasing the width of the band of contact between the mating pieces. The surface of an internal tooth has a concave form while the surface of an external gear has a convex form. Therefore, these two surfaces tend to conform to each other or create more wrap-around than the surfaces of two mating external gears. This surface overlap or wrap-around will increase the width of the band of contact under the same pressure conditions and thus provide better control of the profile on the work gear during the rolling cycle.

In theory, the contact between mating gear teeth is a line contact. In practice however, and particularly in gear rolling under heavy pressure, this contact becomes a band of appreciable width due to yield and deformation of metal, primarily in the teeth of the gear. Teeth of external involute gears have convex side surfaces. Teeth of an internal involute gear have concave side surfaces. Therefore, under identical pressure conditions, the width of the band of contact differs between the teeth of two external gears in contact, and teeth of internal and external gears in contact.

It is the purpose of the present invention to improve the results obtained in rolling a gear or pinion and particularly a spur gear or pinion by (1) increasing the number of teeth in contact, and (2) increasing the width of the band of contact of the teeth. This is accomplished by providing the die in the form of an internally toothed gear which increases the width of the band of contact and increases the number of teeth in contact.

By properly designing the internally toothed die, it is further possible to bring about a situation in which the number of pairs of tooth areas in contact is a unit, as for example 2 or 3. This means that at the instant one pair of mating tooth surfaces comes into engagement, a second pair leaves engagement. As a result of this, the unit pressure applied in the working zones may be substantially uniform, so far as number of teeth in contact are concerned.

DETAILED DESCRIPTION

Figure 1:
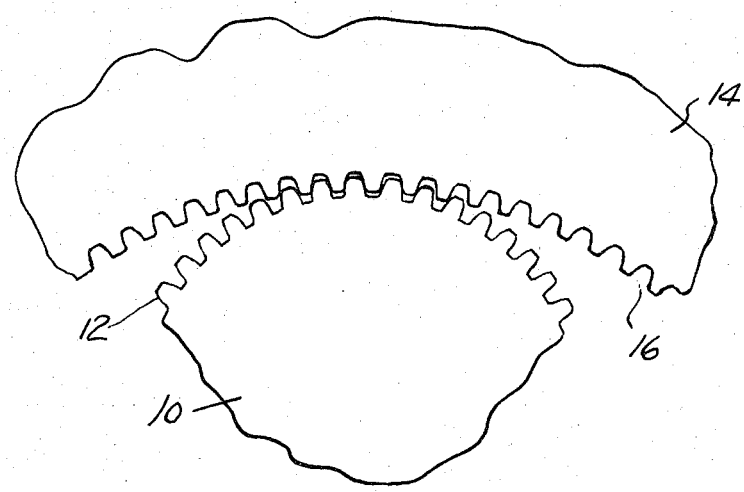
FIG. 1 is a fragmentary view showing the relationship between a meshed internal die and external pinion.

In FIG. 1 there is shown a portion of a pinion 10 having teeth 12 in tight mesh with a die 14 in the form of a hardened steel internal gear having teeth 16 substantially conjugate to the required final form of teeth 12 of the pinion.

The present invention is applicable to finishing either spur or helical pinions, with improved results in both cases. However, as applied to spur pinions it provides for the first time a practical method for finishing these parts by rolling.

Figure 2:
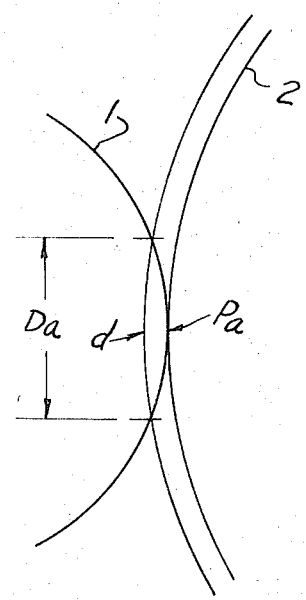
FIGS. 2 and 3 are diagrammatic showings of operating differences in using internal and external dies.
Figure 3:
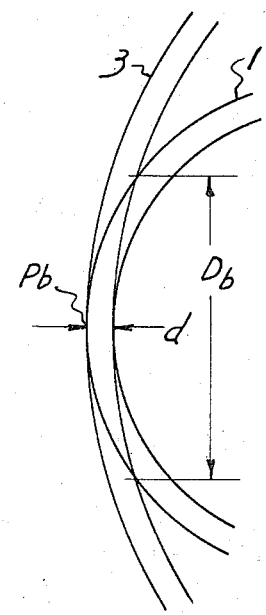

In FIGS. 2 and 3 there is shown diagrammatically the deformation of a convex surface by convex and concave forming surfaces of the same diameter, assuming for illustrative purposes that all deformation takes place in the member having the surface of smaller radius of curvature, which represents a portion of the gear tooth in these Figures.

In FIG. 2 a convex arc 1 is shown in contact at point Pa with a larger convex arc 2. The arcs 1 and 2 represent portions of surfaces of meshing gear and die teeth, respectively. If it is assumed that arc 2 is caused to penetrate into arc 1 by a dimension $d$, then the width of the band of contact resulting from this penetration is DA. In FIG. 3 there is shown the comparative situation when concave arc 3, initially tangent to convex arc 1 (assumed to be the same arc as shown in FIG. 1), at Pb, penetrates into arc 1 by a dimension $d$ (the same dimension as dimension $d$ in FIG. 1). This will result in a band of contact having a width Db, which is very substantially greater than the width Da.

It is of course understood that the force required to produce the penetration $d$ of the die in the situation represented in FIG. 2 is greater than in FIG. 1, or in other words, identical force applied in the situations represented in FIGS. 1 and 2 will result in greater penetration in FIG. 1. However, the effect of using an internally toothed die, in which the sides of the teeth are concave, is to widen the band of contact.

As previously indicated, the present invention is intended to finish spur teeth on a cylindrical gear or pinion by meshing them with internal spur teeth of a hardened steel die. Accordingly, the axes of the gear or pinion and die are substantially parallel. However, it has been found in practice desirable to provide for minor angular adjustment primarily for the purpose of overcoming observed errors in lead and taper.

By way of a specific example, a 26-tooth spur pinion, 10 pitch, 22.5° pressure angle having a pitch diameter of 2.600 inch was satisfactorily roll-finished employing an annular die conjugate to the pinion and having 80 internal spur teeth.

While of particular value in finish rolling spur pinions, improved results are obtained in finish rolling helical pinions.

What I claim as my invention is:

1. The method of finish rolling a cylindrical pinion member which comprises supporting it in tight mesh with a conjugate internally toothed hardened steel die member with the axes of work pieces and die parallel, driving one of the members directly in rotation and thereby driving the other member as a result of the meshed engagement between the members, and applying pressure of metal deforming intensity between the teeth of the members by relatively moving said members toward each other along a path perpendicular to the axes of both of said members to deform the metal of the teeth of the work gear members to a form conjugate to the form of the teeth on the hardened steel die member.

2. The method as defined in claim 1 which comprises selecting an internaly toothed die in which the number of pairs of tooth areas in contact with the pinion members is greater then 1.

3. The method as defined in claim 1 which comprises selecting an internally toothed die in which the number of teeth in contact with the teeth of pinion members is substantially unitary.

4. The method as defined in claim 1 in which the teeth of said members are helical.

5. The method as defined in claim 1 in which the teeth of said members are spur.

6. The method as defined in claim 2 which comprises selecting an internally toothed die in which the number of pairs of tooth areas in contact with the pinion members is greater than 1.

7. The method as defined in claim 2 which comprises selecting an internally toothed die in which the number of teeth in contact with the teeth of pinion members is substantially unitary.

* * * * *